United States Patent [19]
Hertz et al.

[11] Patent Number: 5,742,655
[45] Date of Patent: Apr. 21, 1998

[54] NEUTRON-ABSORBENT CONTROL CLUSTER FOR A NUCLEAR REACTOR

[75] Inventors: Dominique Hertz, Sainte-Foy-les-Lyon; Luc Pillet, Lyons, both of France

[73] Assignees: Framatome, Courbevoie; Compagnie Generale des Matieres Nucleaires, Velizy-Villacoubly, both of France

[21] Appl. No.: 570,874

[22] Filed: Dec. 12, 1995

[30] Foreign Application Priority Data

Dec. 13, 1994 [FR] France ................................. 94 14987

[51] Int. Cl.⁶ .................................................. G21C 7/24
[52] U.S. Cl. .................................... 376/333; 376/236
[58] Field of Search ............................... 376/327, 333, 376/224, 225, 236, 237

[56] References Cited

U.S. PATENT DOCUMENTS

| | | | |
|---|---|---|---|
| 4,470,949 | 9/1984 | Deroubaix et al. | 376/217 |
| 4,624,827 | 11/1986 | Doshi et al. | 376/333 |
| 4,642,216 | 2/1987 | Orr et al. | 376/327 |
| 4,678,628 | 7/1987 | Freeman | 376/333 |
| 4,699,756 | 10/1987 | Nguyen | 376/333 |
| 5,064,607 | 11/1991 | Miller et al. | 376/333 |

FOREIGN PATENT DOCUMENTS

| | | |
|---|---|---|
| 0212920 | 3/1987 | European Pat. Off. . |
| 0364910 | 4/1990 | European Pat. Off. . |
| 2663776 | 12/1991 | France . |

OTHER PUBLICATIONS

Kerntechnik, vol. 57, No. 2, Apr. 1, 1992, pp. 102–106, XP00029 2838 Vesterlund G et al "Development of ABB control rods and operational experience"—pp. 105–106, Figs. 7,8.

*Primary Examiner*—Harvey E. Behrend
*Attorney, Agent, or Firm*—Pollock, Vande Sande & Priddy

[57] ABSTRACT

A control cluster for a water cooled and moderated nuclear reactor, comprises a spider and rods suspended from the spider. Each rod contains neutron-absorbing material. In a lower portion of each rod, the material is a metal neutron absorber. In an upper portion, it is a stack of pellets of boron carbide $B_4C$. In a middle fraction occupying a height lying in the range 35% to 45% of the total height, it is zirconium diboride $ZrB_2$ isotopically enriched in boron 10 or hafnium diboride HfB2.

8 Claims, 1 Drawing Sheet

FIG.2.
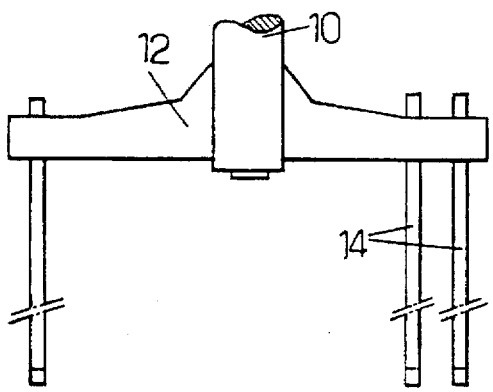
FIG.3.
FIG.1.
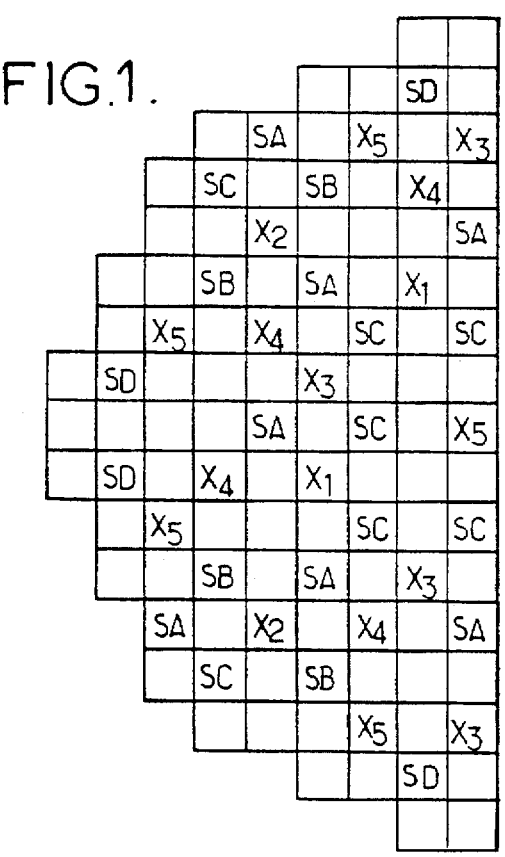
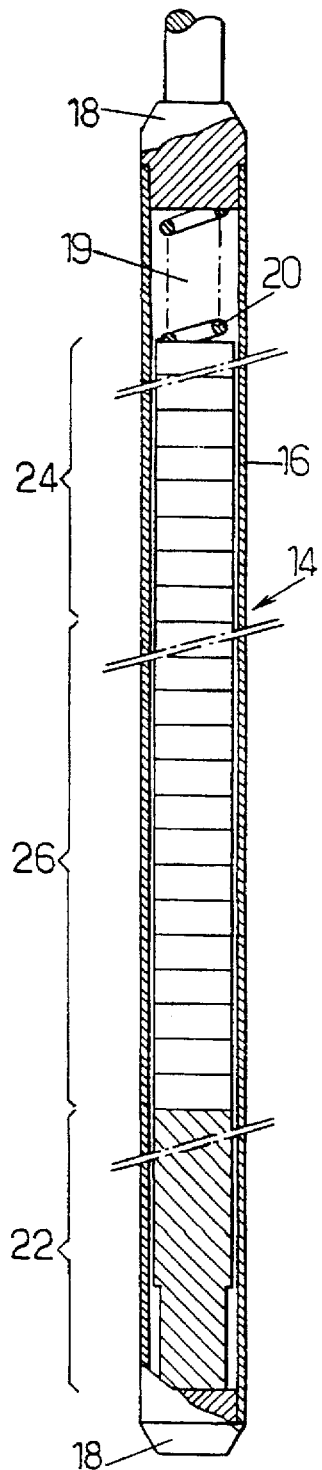

NEUTRON-ABSORBENT CONTROL CLUSTER FOR A NUCLEAR REACTOR

BACKGROUND OF THE INVENTION

The present invention relates to control clusters for water moderated and cooled nuclear reactors; such clusters are displaceable vertically by a mechanism enabling them to be inserted to a greater or lesser extent in the core for the purpose of controlling neutron flux, thereby controlling the power of the reactor, and possibly shutting down the reactor to a stop and keeping it stopped.

The invention is usable in particular in reactors that are moderated and cooled by pressurized water, in which the core is constituted by fuel assemblies each having a bundle of fuel rods held at the nodal points of a regular array by a skeleton formed of endpieces interconnected by guide tubes carrying rod-centering grids. Under such circumstances, each cluster is constituted by a spider that is displaceable by a control mechanism and carries rods of absorbent material for insertion to a greater or lesser depth in the guide tubes or even for being totally removed from the core.

Usually, power control and stopping of a reactor requires a plurality of clusters of different structures (such as "black" clusters that are highly absorbent and "gray" clusters that are less absorbent), particularly when the reactor is designed to operate in "load following" mode, which requires the control clusters to be displaced frequently through moderate amounts. By way of example, control methods of this type are described in the documents EP-A-0 051 542 (patent FR 80 23452) and FR-A-2 639 141 (patent FR 88 14771) to which reference may be made.

"Black" clusters having anti-reactivity of about 150 pcm (parts per hundred thousand), for example, contain a material that is highly absorbent. The material may be constituted, in particular, by a silver-indium-cadmium alloy such as one of those described in document FR-A-1 214 215. In recent 1300 MWe reactors, some of the black clusters nevertheless contain a composite stack, comprising a ternary Ag—In—Cd alloy at the bottom which is liable to spend long periods of time in the core, and boron carbide $B_4C$ at the top.

Conventionally, "gray" clusters are used having anti-reactivity which may for instance be half that of "black" clusters, and these gray clusters are distributed for the purpose of controlling power. They are often distributed between a first group which is inserted first into the core when beginning to reduce power, and a second group which is inserted into the core only when it is desired to reduce reactor power to a level lying in the range about 50% to 80% of the set power. The clusters in the second group are fully inserted only for the purpose of stopping the reactor and keeping it stopped.

For easier operation of reactors of the above-defined type, new control rules have been developed making it possible to regulate temperature and to regulate the axial distribution of neutron flux simultaneously with controlling power.

These control rules require some of the "black" clusters to be inserted into the core to a much greater depth than the insertion depth required in current operation using earlier methods of control.

Furthermore, these control rules require that material having greater neutron absorbing capacity than that of the ternary Ag—In—Cd alloy, be present over a fraction of the height of black cluster rods which used rarely to be inserted into the core, apart from during periods of reactor shutdown.

This level of absorption could be obtained using clusters having rods containing a stack of $B_4C$ pellets above a lower portion filled with Ag—In—Cd. However, the fluence in the middle portion of the stack reaches values such that the $B_4C$ placed in said portions of the rods is subjected to swelling under irradiation that would limit the lifetime of such clusters within a reactor.

SUMMARY OF THE INVENTION

An object of the invention is to provide a "black" control cluster that typically has anti-reactivity exceeding 150 pcm when fully inserted, that has increased lifetime under such conditions when used with a control method that requires the cluster to be inserted frequently to considerable depth into the core.

To this end, there is proviced a control cluster for a nuclear reactor, comprising a spider from which rods are suspended, each rod containing neutron-absorbing material constituted, at a lower portion of each rod, by a metal absorber such as hafnium, or more commonly an Ag—In—Cd alloy, and an upper portion of the rod, by a stack of pellets of boron carbide $B_4C$; over a middle fraction of each rod, occupying a height lying in the range 35% to 45% of the height of the absorbent material, absorbent material is zirconium diboride $ZrB_2$ isotopically enriched in boron 10 or hafnium diboride $HfB_2$.

The Ag—In—Cd alloy (or the hafnium) generally occupies a fraction of the height of the absorbent material lying in the range 30% to 40%, frequently about 35%, whereas the $B_4C$ column generally occupies a fraction of the height of absorbent material that lies in the range 20% to 30%, and is typically about 24%.

In such a cluster, the middle portions of the rods, that need to have high anti-reactivity and that are within the core, contain often a material that swells much less under irradiation than does B4C. Whereas the pellets of $B_4C$ in which the boron is not enriched suffer significant damage once the quantity of boron 10 consumed exceeds about 16%, with helium release lying in the range 11% to 20%, more favorable results are obtained with $ZrB_2$, particularly when enriched to 25% to 45% with boron 10. Results are also improved with $HfB_2$.

Such a control cluster for a nuclear reactor can be used for regulating power and for tracking load, and to a large extent it makes it possible to reconcile the above contradictory requirements.

The invention also provides a nuclear reactor of the above-defined kind including clusters of rods displaceable by control means between the core and upper internals, said clusters comprising "black" clusters and, for power regulation, "gray" clusters of anti-reactivity that is less than that of the black clusters, where only some of the black clusters have the above-defined structure.

When, as is frequently the case, the black clusters are split into two groups, one of which is inserted frequently, while the other is inserted to bring the reactor to low power or to shut it down, the clusters in the first-inserted group are of the above-defined structure.

The invention will be better understood on reading the following description of particular embodiments of the invention, given as non-limiting examples. The description refers to the accompanying drawings.

BRIEF DESCRIPTION OF THE DRAWINGS

FIG. 1 is a diagram showing one possible distribution of black and gray clusters in the core of a pressurized water reactor;, according to an aspect of the invention;

FIG. 2 is a schematic view of a cluster spider and of the rods it supports, in elevation;

FIG. 3 shows one possible distribution of absorbent materials in a black cluster for control purposes.

DETAILED DESCRIPTION OF PREFERRED EMBODIMENTS

Various possible embodiments of the invention are described below suitable for application to a reactor whose core is built up of assemblies of square cross-section, distributed as shown in FIG. 1. However, the invention is also applicable to other reactors, having a hexagonal pattern and/or possibly including not only clusters for parasitic neutron absorption, but also clusters for varying the neutron energy spectrum.

Referring to FIG. 1, there can be seen only the locations of clusters having control mechanisms that enable them to be lowered into the core or withdrawn from the core. Locations referenced $X_1$ to $X_5$ receive regulation clusters, and those clusters include "black" clusters referenced $X_2$. The locations referenced SA, SB, SC, and SD receive stop or shutdown clusters.

In conventional manner, the rods of clusters in locations $X_1$ may contain the same neutron absorbing material over their entire height, e.g. a ternary Ag—In—Cd alloy containing 80% silver, 15% indium, and 5% cadmium, by weight. They may also each contain a bar of an Ag—In—Cd alloy in their lower portions with pellets of $B_4C$ in their upper portions.

Each cluster often has the structure shown in FIG. 2. It comprises a spider 10 whose hub is designed to be fixed to a control shaft and whose radiating arms 12 carry one or two rods each. The cluster shown by way of example in FIG. 2 has twenty-four rods.

Referring to FIG. 3 (which is not to scale for reasons of clarity), each rod 14 comprises a sheath 16 closed by plugs 18 and containing a column of absorbent materials pressed down against a bottom plug by a spring 20 which is compressed between the column and a top plug.

In one of the types of pressurized water reactor (PWR) presently in use, having a power of 1450 MWe, all rods are about 4300 mm long, and they have absorbent materials occupying them over a height of 4150 mm, the empty space 19 serving as a "plenum" volume for collecting helium due to neutron absorption by boron 10.

The absorbent material 22 in the lower portion of the rod is Hf or Ag—In—Cd alloy, e.g. in the form of a solid bar of a height that occupies 30% to 40%, and generally about 35% of the total height of the column.

The upper portion of the column of absorbent material, which is subjected to intense neutron flux only occasionally and which must be a material having a large capture cross-section, is constituted by a stack 24 of pellets of $B_4C$ in which the boron has its natural content of boron 10.

The middle fraction 26 of the column of absorbent materials is constituted by a stack of pellets of a material which:

has a neutron capture cross-section that is at least about as great as that of $B_4C$;

for a same B10 depletion ratio and for a same shape, swells under irradiation less than does $B_4C$;

for equivalent neutron absorption effectiveness, has a mass that is not significantly greater; and corrodes in pressurized water in a manner that is at least as good as that of $B_4C$.

In a first embodiment, the middle section of the column is constituted by sintered pellets of $HfB_2$ which has the advantage of being made up of two absorbent atoms since the 177 isotope of hafnium has a large neutron capture cross-section and after absorbing a neutron is transformed into Hf178 which is also highly absorbent.

For the control methods that are presently under consideration, the fraction of the height of the absorbent column occupied by $HfB_2$ should lie in the range 35% to 45%, and will often be about 41% when the Ag—In—Cd alloy occupies a fraction of 35%. Under such circumstances, the pellets of boron carbide in the rods are placed high enough in the rod to avoid being subjected to high flux levels, except during short periods of time.

A first solution consists in using solid pellets sintered under conditions such that pellet density is about 70% of the theoretical density of the solid. Thus, the mass increase of a rod as compared with rods commonly in use at present, in which the pellets are of $B_4C$ instead of $HfB_2$, remain moderate and makes it possible to use the same cluster control mechanisms. This solution has the advantage of making it possible to use the same control mechanisms for all black bars.

Another solution consists in using annular pellets of $HfB_2$ so as to reduce the volume of the pellets: it is then possible to use annular pellets sintered under conditions such that the density of $HfB_2$ reaches as much as 95% of the theoretical density of the solid. An inner sleeve of zirconium-based alloy may then be used to center the pellets relative to one another. This solution makes it possible to take advantage of the greater mechanical strength of pellets of higher density.

By way of example, it may be mentioned that a rod for a black cluster may have a sheath with an inside length of 4340 mm which accomodates, over 145 cm, Ag—In—Cd, over 170 cm $HfB_2$, and over 100 cm $B_4C$, thereby leaving a helium-collecting volume or plenum that is 19 cm long. The Ag—In—Cd bar may be stepped. For example, its outside diameter may be 8.53 mm at the foot over a height of 75 cm, and higher by 0.10 mm to 0.15 mm at the top, within a sheath having an inside diameter of 8.73 mm.

It is not necessary to provide a pressurized helium atmosphere of in the plenum 19: the helium given off due to neutron absorbtion by boron and then released under radiation quickly establishes adequate pressure.

In another embodiment, the middle portion of the column is constituted by a stack of $ZrB_2$ pellets. The heights of the bar of Ag—In—Cd, of the stack of $ZrB_2$ pellets, and of the stack of $B_4C$ pellets may be the same as in the preceding case. In general, the Ag—In—Cd bar will still have a reduced diameter (by 0.10 mm to 0.15 mm) over about half of its height. The pellets of $ZrB_2$ and of $B_4C$ may have a set diameter that is 1 mm smaller than in the preceding case.

In order to ensure that the stack of $ZrB_2$ has neutron absorption that is comparable to that of the pellets of $B_4C$ which it replaces, the boron will typically be enriched to about 30% of boron 10, assuming the pellets are sintered so as to have a density equal to about 80% of the theoretical density of the solid. When the pellets are of higher density, up to about 95% of the theoretical density of the solid, the content of boron 10 may be reduced, down to about 25%.

Zirconium diboride and Hafnium diboride for implementing the invention may be manufactured by boriding the corresponding oxide at a temperature of about 2000° C. in the presence of carbon. The reaction may be performed under conditions such that the residual carbide content does not exceed 0.3%. The presence of carbide improves the sinterability of the diboride and, if so desired, makes it possible to achieve densities of up to 98% of the theoretical density of the solid.

We claim:

1. A control cluster for a water cooled and moderated nuclear reactor, comprising a spider and rods suspended from said spider, each of said rods containing neutron-absorbing material over a predetermined height, wherein said material is constituted:

in a lower portion of each said rod, by a metal neutron absorber;

in an upper portion of each said rod, by a stack of pellets of boron carbide $B_4C$; and in a middle fraction of each said rod, occupying a height lying in the range 35% to 45% of the predetermined height, a material selected from the group consisting of zirconium diboride $ZrB_2$ isotopically enriched in boron 10 and hafnium diboride HfB2.

2. Control cluster according to claim 1, wherein the metal neutron absorber is hafnium or an Ag—In—Cd alloy.

3. Control cluster according to claim 1, wherein the lower portion has a height lying in the range 30% to 40% of said predetermined height and said stack occupies a fraction of the predetermined height of neutron absorbing material that lies in the range 20% to 30%.

4. Control cluster according to claim 3, wherein said lower portion and said upper portion have heights which are respectively about 35% and 24% of the complete height.

5. Control cluster according to claim 1, wherein said material in the middle portion is $ZrB_2$ having a boron 10 content of 25% to 45% and having a density of 80% to 95% of a theoretical maximum density of $ZrB_2$.

6. Control cluster according to claim 1, wherein said material in the middle portion is hafnium diboride without enrichment of the boron in bore 10, having a density of about 70% of a theoretical maximum density of $ZrB_2$.

7. Control cluster according to claim 1, wherein said material in the middle portion is a stack of annular pellets of hafnium diboride having a natural content of boron 10 having and a density of from 70 to 95% of the maximum theoretical density of $HfB_2$.

8. A water cooled and moderated nuclear reactor having a core, upper internals above the core and a plurality of control clusters each displaceable vertically between said core and said upper internals and each of said clusters having a spider and having rods suspended from said spider and each containing neutron absorbing material, wherein said control clusters comprise black clusters having a high degree of anti-reactivity and gray clusters having a degree of anti-reactivity lesser than that of black clusters, and wherein neutron absorbing material in the rods of only some of said black clusters is constituted:

in a lower portion of each said rod, by a metal neutron absorber selected from the group consisting of hafnium and Ag—In—Cd alloy;

in an upper portion of each said rod, by a stack of pellets of boron carbide $B_4C$; and in a middle portion of each said rod, occupying a length in the range 35% to 45% of a complete height of the neutron absorbing material, a material selected from the group consisting of zirconium diboride $ZrB_2$ isotopically enriched in boron 10 and hafnium diboride HfB2.

* * * * *